US006936389B2

(12) United States Patent
Iizuka et al.

(10) Patent No.: US 6,936,389 B2
(45) Date of Patent: *Aug. 30, 2005

(54) BASE BODY FOR PHOTOSENSITIVE DRUM AND PHOTOSENSITIVE DRUM

(75) Inventors: Munenori Iizuka, Kodaira (JP); Kunio Machida, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/905,879

(22) Filed: Jul. 17, 2001

(65) Prior Publication Data

US 2002/0045118 A1 Apr. 18, 2002

(30) Foreign Application Priority Data

Jul. 17, 2000 (JP) ....................................... 2000-216417
Jul. 17, 2000 (JP) ....................................... 2000-216434
Jul. 17, 2000 (JP) ....................................... 2000-216441
Aug. 30, 2000 (JP) ....................................... 2000-261199

(51) Int. Cl.[7] .......................... G03G 15/04; B32B 1/08; F16L 9/18; F16L 9/12; F16L 9/14

(52) U.S. Cl. ....................... 430/69; 428/34.1; 428/35.7; 428/36.4; 428/36.9; 428/36.91

(58) Field of Search ............................... 428/34.4, 36.4, 428/34.1, 35.7, 36.9, 36.91, 36.92, 32.1, 32.18, 32.19, 32.2, 32.31, 32.33, 32.6, 32.63, 32.87; 430/69, 62, 63

(56) References Cited

U.S. PATENT DOCUMENTS 4,762,762 A * 8/1988 Honda et al. ................. 430/65
4,788,120 A * 11/1988 Shirai et al. .................. 430/66
5,104,717 A * 4/1992 Landa et al. ............. 428/32.31
5,514,506 A * 5/1996 Takai et al. ................... 430/57
5,609,985 A * 3/1997 Taniguchi et al. .......... 430/259
6,221,547 B1 * 4/2001 Iizuka et al. .................. 430/69
6,261,994 B1 * 7/2001 Bourdelais et al. ......... 503/227
6,436,515 B1 * 8/2002 Ohbayashi et al. ...... 428/32.33
6,458,449 B1 * 10/2002 Parent et al. .............. 428/32.1
6,561,638 B1 * 5/2003 Iijima et al. ............. 428/32.31

* cited by examiner

*Primary Examiner*—Harold Pyon
*Assistant Examiner*—Walter B Aughenbaugh
(74) *Attorney, Agent, or Firm*—Sughrue Mion, PLLC

(57) ABSTRACT

A resin made base body in the form of a pipe has (1) a plurality of alternating projections and depressions which are provided on an outer peripheral surface of the pipe and aligned in substantially parallel rows in one of an axial direction and a circumferential direction of the pipe; (2) a specular gloss at 60° of a surface of the pipe in a range of 15 to 25; or (3) a skin layer formed in an outer peripheral portion in the thickness direction of a peripheral wall of the pipe, wherein an amount of the conductive agent present in the skin layer is equal to, or less than, one-tenth an amount of the conductive agent present in a central portion in the thickness direction of the peripheral wall of the pipe.

8 Claims, 2 Drawing Sheets

FIG 2-A
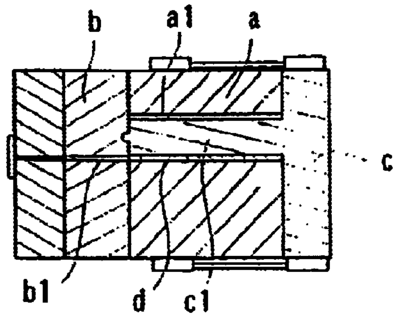
FIG 2-B
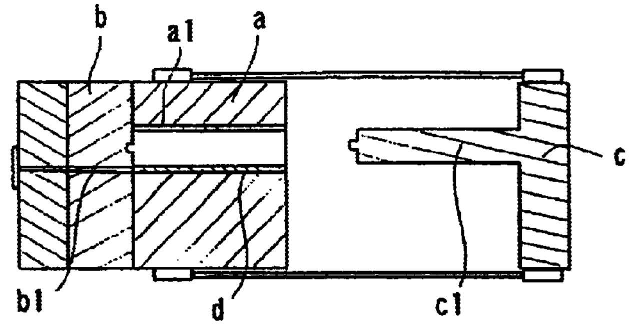
FIG 2-C
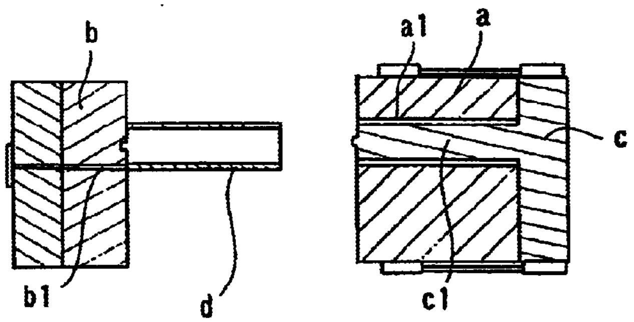
FIG 2-D
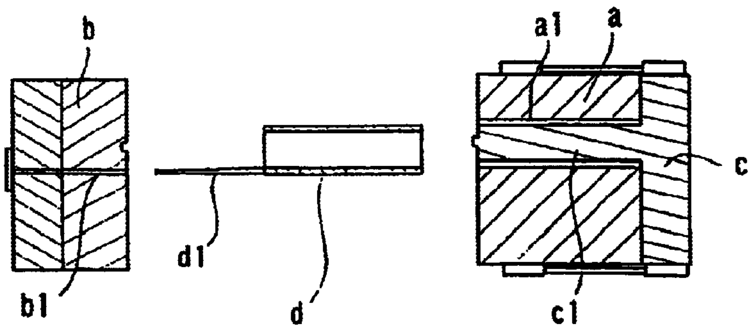

BASE BODY FOR PHOTOSENSITIVE DRUM AND PHOTOSENSITIVE DRUM

BACKGROUND OF THE INVENTION

The present invention relates to a cylindrical base body for a photosensitive drum used for an electrophotographic apparatus and an electrostatic recording apparatus, a photosensitive drum using the base body, and a method of producing the base body.

In an electrostatic recording process using a copying machine, a facsimile, a printer, and the like, the printing is performed by uniformly electrostatically charging the surface of a photosensitive drum; projecting an image from an optical system on the surface of the photosensitive drum, to erase the charges on a portion, on which light has impinged, of the surface of the photosensitive drum, thereby forming an electrostatic latent image thereon; supplying toner to the electrostatic latent image, to form a toner image by electrostatic adhesion of the toner thereon, and transferring the toner image to a recording medium such as paper, OHP sheets (transparency), and photographic paper.

As the photosensitive drum used for such an electrostatic recording process, a photosensitive drum having a structure shown in FIG. 1 has been generally used.

The photosensitive drum is configured such that flanges 2*a* and 2*b* are fixedly fitted to both ends of a cylindrical base body 1 having good conductivity, and a photosensitive layer 3 is formed on the outer peripheral surface of the cylindrical base body 1. In general, as shown in FIG. 1, two supporting shafts 4 provided on a main body "a" of an electrophotographic apparatus are inserted in two shaft holes 5 provided in both the flanges 2*a* and 2*b*, and a drive gear 6 formed on one flange 2*b* is meshed with a gear 7 connected to a motor or the like as a drive source, whereby the photosensitive drum is rotatably supported by the main body "a" of the electrophotographic apparatus.

The cylindrical base body 1 has been made from an aluminum alloy being in relatively lightweight and being good in machinability and conductivity.

The cylindrical base body made from an aluminum alloy must be highly accurately machined in order to satisfy requirements for strict dimensional accuracy and specific surface roughness. Also, portions in which the flanges 2*a* and 2*b* are to be fixedly fitted must be formed in both the ends of the cylindrical base body by machining. Further, the cylindrical base body must be subjected to a surface treatment for preventing oxidation or the like, as needed. This presents a problem in increasing the number of production steps, thereby raising the production cost. In this way, an aluminum alloy is not necessarily suitable as the material for forming the cylindrical base body of a photosensitive drum.

On the other hand, there has been known a photosensitive drum using a resin pipe as the cylindrical base body 1. The resin pipe is formed by injection-molding a conductive resin composition containing a thermoplastic resin and a conductive agent such as carbon dispersed therein. In this case, as described above, the outer peripheral surface of the cylindrical base body 1 is coated with the photosensitive layer 3. In the case of using such a resin made base body, at least one of the flanges 2*a* and 2*b* is made from a resin in such a manner as to be integrated with the resin made base body 1, and further, the drive gear 6 is also formed integrally with the flange integrated with the base body 1.

The photosensitive drum using the resin made base body is advantageous in omitting a number of machining steps, which has been required in the case of using the base body made from an aluminum alloy, and in reducing the weight of the photosensitive drum. Further, by integrating the flange and drive gear with the base body, it is possible to significantly stabilize conduction between the flange and drive gear and the base body.

The photosensitive drum using the resin made base body, however, may often fail to obtain a good image quality, and is expected to be improved in terms of such a point.

On the other hand, in the case of producing a photosensitive drum by forming the photosensitive layer 3 on the base body 1 as shown in FIG. 1, an under coat layer (not shown in FIG. 1) is generally formed between the base body 1 and the photosensitive layer 3.

The under coat layer serves as a primer for enhancing adhesiveness of the photosensitive layer, and as a insulating layer for covering microscopic abnormality (burrs and damages) on the surface of the base body so as to keep good electric performance. The under coat layer is generally configured as an insulating layer made from an amorphous copolymer nylon mainly containing nylon 12. Such an under coat layer is generally provided not only for the base body made from aluminum but also for the base body made from a conductive resin.

The formation of the under coat layer, however, requires a resin coating step, and from the viewpoint of cost reduction, it is expected to omit the formation of such an under coat layer.

SUMMARY OF THE INVENTION

In view of the foregoing, the present invention has been made, and a first object of the present invention is to provide a base body for a photosensitive drum, which is made from a resin and is capable of improving an image quality obtained by using the photosensitive drum including the base body, a photosensitive drum using the base body for a photosensitive drum, and a method of producing the base body for a photosensitive drum.

Another object of the present invention is to provide a base body for a photosensitive drum, which can be produced without formation of an under coat layer, and a photosensitive drum using the base body.

To achieve the first object, the present inventor has earnestly examined and found that in the case of producing a photosensitive drum by forming a photosensitive layer on a resin made base body, a higher smoothness of the surface of the base body does not necessarily contribute to obtainment of higher image quality, and rather, the presence of suitable irregularities on the surface of the base body contributes to improvement of image quality. This will be described in detail below. A photosensitive layer is provided on a base body of a photosensitive drum, and a transparent layer having a thickness of about 20 to 30 $\mu$m is present on the surface of the photosensitive layer. As a result, at the time of exposure, two reflection planes are present on both the surface of the transparent layer and the lowermost surface (interface with the base body) of the photosensitive layer. If the smoothness on the surface of the base body is very high, light rays being identical to each other in traveling direction and different from each other in light pass length interfere with each other by the presence of the two reflection planes, to degrade image quality. If suitable irregularities are formed on the surface of the base body, the above light rays are irregularly reflected and the directions of the light rays are scattered, to effectively prevent degradation of the image quality due to interference between light rays, thereby improving the image quality.

The present inventor has further examined and found that it is effective for obtaining a high quality to suitably coarsen the outer peripheral surface of a cylindrical resin made base body by forming a large number of irregularities composed of microscopic stripe-shaped projections and depressions extending in the axial direction or in the circumferential direction on the outer peripheral surface of the resin made base body. In this case, it has been found that in the case of forming irregularities on the outer peripheral surface of the cylindrical resin made base body, if the irregularities are stripe-shaped irregularities extending in the axial direction of the base body, these irregularities can be formed as follows: namely, at the time of forming a pipe-like molded product by injection molding and removing the molded product from a mold, the molded product is pulled from a cylindrical cavity of the mold in the axial direction, so that the outer peripheral surface of the molded product is suitably coarsened at the time of pulling the molded product, to form a large number of microscopic projections and depressions extending in the axial direction on the outer peripheral surface of the molded product, thereby easily forming, on the surface of the molded product, suitable irregularities capable of achieving the above object.

Accordingly, the present invention provides the following inventions (1) to (3) as the first invention for achieving the above first object, and provides inventions (4) and (5) as the second invention for achieving the first object.

(1) A base body for a photosensitive drum, including a pipe made from a synthetic resin, wherein a large number of irregularities composed of microscopic stripe-shaped projections and depressions extending in the axial direction of the pipe are formed on an outer peripheral surface of the pipe.

(2) A photosensitive drum including a cylindrical base body, and a photosensitive layer formed on an outer peripheral surface of the cylindrical base body by coating, wherein the base body for a photosensitive drum described in the item (1) is used as the cylindrical base body.

(3) A method of producing the base body for a photosensitive drum described in the item (1), including the steps of: placing a columnar core in a cylindrical cavity of a mold and injecting a molten resin material in a space between the core and an inner peripheral surface of the cavity, to form a pipe-like molded product; and removing the molded product from the mold by pulling the molded product out of the cavity, to obtain a synthetic resin made base body for a photosensitive drum; wherein in the step of removing the molded product from the mold by pulling the molded product out of the cavity, microscopic stripe-shaped irregularities extending in the axial direction of the molded product are formed on an outer peripheral surface of the molded product.

(4) A base body for a photosensitive drum, including a pipe made from a synthetic resin, wherein a large number of irregularities composed of microscopic stripe-shaped projections and depressions extending in the circumferential direction of the pipe are formed on an outer peripheral surface of the pipe.

(5) A photosensitive drum including a cylindrical base body, and a photosensitive layer formed on an outer peripheral surface of the cylindrical base body by coating, wherein the base body for a photosensitive drum described in the item (4) is used as the cylindrical base body.

To achieve the first object, the present inventor has further examined and found that in the case of producing a photosensitive drum by forming a photosensitive layer on a resin made base body, the surface gloss of the base body exerts an effect on the image quality obtained by using the photosensitive drum, and therefore, the image quality can be improved by optimizing the surface gloss of the base body. To be more specific, if the base body of the photosensitive drum is made from a conductive resin, the surface of the base body is required to have a specific uniformity; however, if the specular gloss of the surface of the base body is excessively low, the surface characteristic (such as smoothness or conductivity) becomes poor, with a result that it is difficult to keep good electric characteristics necessary for the photosensitive drum, while if the specular gloss is excessively high, microscopic damages become conspicuous at the time of exposure, to exert adverse effect on the electric characteristics. Eventually, the present inventor has found that in order to ensure good electric characteristics of the photosensitive drum, the specular gloss is required to be set in a specific range, and the image quality can be improved by optimizing the specular gloss.

To find a specular gloss most suitable for a base body for a photosensitive drum, the present inventor has further examined and found that a photosensitive drum having good electric characteristics can be certainly produced to thereby improve image quality obtained by using the photosensitive drum by adjusting a specular gloss at 60° of the surface of the base body, specified under JIS Z8741, in a range of 12 to 30, preferably, 12 to 25.

Accordingly, the present invention provides the following inventions (6) and (7) as the third invention capable of achieving the first object.

(6) A base body for a photosensitive drum, including a pipe made from a synthetic resin, wherein a specular gloss at 60° of a surface of the pipe, specified under JIS Z8741, is in a range of 12 to 30.

(7) A photosensitive drum including a cylindrical base body, and a photosensitive layer formed on an outer peripheral surface of the cylindrical base body by coating, wherein the base body for a photosensitive drum described in the item (6) is used as the cylindrical base body.

To achieve the above second object, the present inventor has earnestly examined and found that in the case of forming a base body for a photosensitive drum, which is composed of a conductive resin pipe obtained by molding a resin composition containing a thermoplastic resin and a conductive agent into a cylindrical shape, a skin layer having a high resistance and a very smooth surface is formed in an outer peripheral portion of a peripheral wall of the resin pipe by selecting the thermoplastic resin and adjusting a molding condition, wherein an amount of the conductive agent in the skin layer is one-tenth or less an amount of the conductive agent in a central portion in the thickness direction of the peripheral wall, and that the skin layer has a function similar to that of a conventional under coat layer and thereby a photosensitive drum having good performances can be obtained even by omitting the formation of the under coat layer.

Accordingly, the present invention provides the following inventions (8) and (9) as the fourth invention capable of achieving the second object.

(8) A base body for a photosensitive drum, including a conductive resin pipe molded from a resin composition containing a thermoplastic resin and a conductive resin, wherein the conductive resin pipe has, at an outer peripheral portion in the thickness direction of a peripheral wall, a skin layer having a high resistance, and an amount of the conductive agent present in the skin layer is equal to or less than one-tenth an amount of the conductive agent present in a central portion in the thickness direction of the peripheral wall of the pipe.

(9) A photosensitive drum including a cylindrical base body, and a photosensitive layer formed on an outer peripheral surface of the cylindrical base body by coating, wherein the base body for a photosensitive drum described in the item (8) is used as the cylindrical base body.

BRIEF DESCRIPTION OF THE DRAWINGS

FIGS. 2-A to 2-D are views illustrating sequential steps of a method of producing a base body for a photosensitive drum according to the present invention.

DETAILED DESCRIPTION OF THE INVENTION

Figure 1:
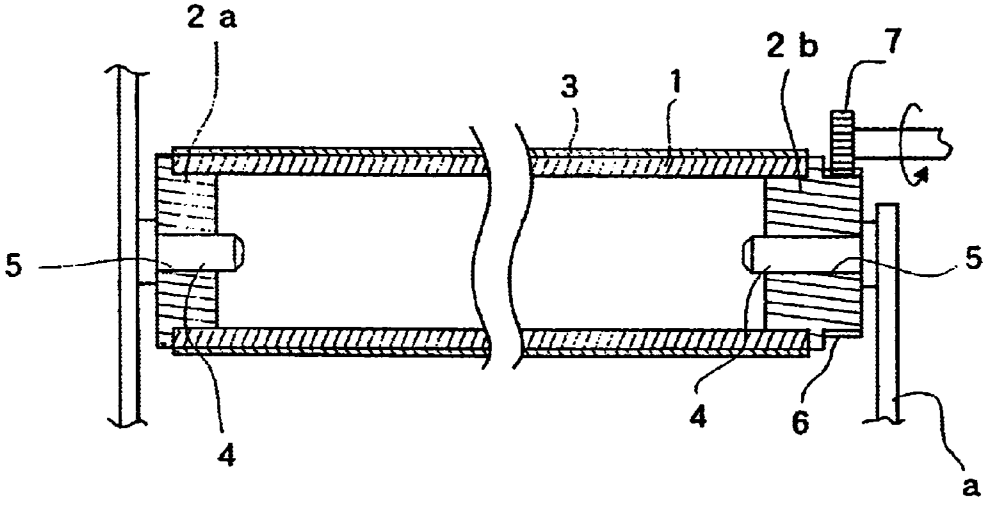
FIG 1 PRIOR ART
FIG. 1 is a sectional view showing a general configuration of a photosensitive drum.

Hereinafter, each of first, second, third, and fourth inventions will be described in detail.

[First and Second Inventions]

First, base bodies for photosensitive drums according to first and second inventions will be described.

The base bodies for photosensitive drums according to the first and second inventions are each configured such that a large number of irregularities composed of microscopic stripe-shaped projections and depressions are formed on the outer peripheral surface of a synthetic resin made pipe, wherein according to the first invention, the irregularities are formed by microscopic stripe-shaped projections and depressions extending in the axial direction of the pipe, and according to the second invention, the irregularities are formed by microscopic stripe-shaped projections and depressions extending in the circumferential direction of the pipe.

As a resin material for forming the above pipe, there may be used, while not particularly limited, a thermoplastic resin or a resin composition mainly containing a thermoplastic resin. In this case, as the thermoplastic resin, there can be used a known thermoplastic resin having been used for a base body for a photosensitive drum, particularly, a polyamide resin such as nylon because it is excellent in chemical resistance and mechanical strength. In particular, a polyamide resin obtained from methaxylylene diamine and adipic acid and/or a polyamide resin obtained from ϵ-caprolactam are preferably used.

It is to be noted that a polyamide resin produced by condensation polymerization of methaxylylene diamine and adipic acid is generally called "nylon MXD6", and a polyamide resin produced by ring-opening polymerization of ϵ-caprolactam is generally called "nylon 6".

According to the first and second inventions, a mixture of a plurality of resins may be used as a molding material for the above pipe. For example, a resin mixture obtained by mixing nylon MXD6 and/or nylon 6 with another resin may be used. In this case, as another resin, there is preferably used, while not particularly limited thereto, another polyamide resin such as nylon 11, nylon 12, nylon 46, nylon 66, nylon 610, nylon 612, nylon 1212, or a copolymer thereof. The mixing ratio of these resins is not particularly limited; however, the content of nylon MXD6, nylon 6, or the mixture thereof may be in a range of at least 30 to 100 wt %, preferably, 40 to 100 wt % on the basis of the total amount of nylon MXD6 and/or nylon 6 and another resin.

In general, a conductive agent is added to the above-described thermoplastic resin for giving a suitable conductivity thereto. The kind of the conductive agent is not particularly limited insofar as the conductive agent can be uniformly dispersed in the resin. Examples of the conductive agents may include carbon black, graphite, a powder of a metal such as aluminum, copper or nickel, or a powder of conductive glass. In particular, carbon black is preferably used. The added amount of the conductive agent may be set, while not particularly limited thereto, in a range of 5 to 30 wt %, preferably, 5 to 20 wt % on the basis of the total amount of the resin composition, so that the surface resistance of the resin pipe be set in a range of $10^4$ Ω/□ (ohm/square) or less, preferably, $10^2$ Ω/□ or less.

An inorganic filler such as fibers can be added to the resin material for reinforcing or weighting the resin material. Examples of the inorganic fillers may include conductive fibers such as carbon fibers, conductive whiskers, or conductive glass fibers; and non-conductive fibers such as whiskers or glass fibers. In this case, since the conductive fibers act as the conductive agent, the use of the conductive fibers can reduce the added amount of the conductive agent.

The added amount of the filler is not particularly limited but is suitably selected depending on the strength necessary for the pipe, kind of the filler, and lengths and diameters of the fibers. In general, the added amount of the filler may be in a range of about 1 to 30 wt %, preferably, about 5 to 25 wt %, more preferably, about 10 to 25 wt % on the basis of the total amount of the resin composition. The addition of such a filler makes it possible to effectively improve the strength and rigidity of a molded product without degrading the surface smoothness of the molded product.

In addition to the above-described conductive agent and filler, a suitable amount of known additives such as polytetrafluoroethylene (PTFE), silicone, molybdenum disulfide ($MoS_2$), various metal soaps can be added to the resin material for forming the pipe. Further, the conductive agent or filler may be subjected to surface treatment by using a generally used silane coupling agent or titanate coupling agent.

The base body for a photosensitive drum according to the first invention is, as described above, configured such that a large number of irregularities composed of microscopic stripe-shaped projections and depressions extending in the axial direction of the resin pipe are formed on the outer peripheral surface of the resin pipe, and the base body for a photosensitive drum according to the second invention is, as described above, configured such that a large number of irregularities composed of microscopic stripe-shaped projections and depressions extending in the circumferential direction of the resin pipe are formed on the outer peripheral surface of the resin pipe.

In this case, the stripe-shaped projections and depressions may be formed substantially along the axial direction (first invention) or the circumferential direction (second invention) of the pipe. For example, in the first invention, projections and depressions may be meanderingly or slantingly formed along the axial direction; and in the second invention, a large number of ring-shaped projections and depressions may be alternately formed along the circumferential direction, or projections and depressions may be spirally, meanderingly, or slantingly formed along the circumferential direction.

The cross-sectional shapes, sizes, and the number of these projections and depressions are not particularly limited; however, the surface roughness of the outer peripheral surface of the pipe, specified under JIS B0601, is preferably adjusted by the projections and depressions such that a center line average height Ra is in a range of 0.01 to 0.2 μm, preferably, 0.03 to 0.07 μm, and a maximum height Rmax is in a range of 0.1 to 0.8 μm, preferably, 0.4 to 0.7 μm. The values Ra and Rmax can be suitably changed depending on the thickness of a photosensitive layer formed on the outer peripheral surface of the resin pipe, and are not necessarily limited to the above range. However, if these values Ra and Rmax are excessively large, the irregularities on the surface of the resin pipe may emerge on the photosensitive layer, resulting in an image failure. If excessively small, the projections and depressions cannot sufficiently scatter light rays, to degrade an image quality due to interference between light rays, with a result that it may fail to achieve the object of the present invention.

The resin pipe may be produced by extrusion molding or injection molding; however, to improve the productivity while ensuring excellent dimensional accuracy, the pipe is preferably produced by injection molding. The formation of the stripe-shaped irregularities on the surface of the resin pipe is not particularly limited. For example, there may be adopted a method of forming stripe-shaped irregularities extending in the axial direction or circumferential direction on the inner peripheral surface of a mold, and transferring the shapes of the irregularities on the surface of the pipe at the time of molding of the pipe, or mechanically forming stripe-shaped irregularities on the surface of the pipe by grinding after molding of the pipe. In particular, to carry out the first invention, that is, to form stripe-shaped projection and depressions extending in the axial direction on the resin pipe, there is preferably adopted a method wherein at the time of removing a resin pipe formed by injection molding from a mold, the pipe is pulled from a cylindrical cavity of the mold, to coarsen the outer peripheral surface of the pipe by scratching the surface, thereby forming stripe-shaped irregularities extending in the axial direction of the pipe. With this method, it is possible to easily form suitable stripe-shaped irregularities extending in the axial direction of the pipe. Meanwhile, to carry out the second invention, that is, to form stripe-shaped irregularities extending in the circumferential direction of the pipe, there is preferably adopted a method wherein stripe-shaped irregularities extending in the circumferential direction formed on the inner peripheral surface of a cavity of a mold are transferred on the outer peripheral surface of the resin pipe at the time of molding of the pipe. With this method, it is possible to form the irregularities extending in the circumferential direction with a good productivity. In this case, even if the molded resin pipe is removed from the mold by pulling the resin pipe out of the cylindrical cavity, the molded resin pipe can be removed from the mold without any difficulty due to undercuts because of contraction of the resin.

To be more specific, the base body for a photosensitive drum according to each of the first and second inventions can be produced by injection molding performed in accordance with a process shown in FIGS. 2-A to 2-D. As shown in FIG. 2-A, a fixed mold "b" provided with a gate "b1" through which a molten resin is to be injected is joined to one end surface of a first movable mold "a" having a columnar cavity "a1" with its both ends opened, and a second movable mold "c" having a columnar core "c1" is joined to the other end surface of the first movable mold "a" in a state in which the core "c1" is inserted in the columnar cavity "a1". A molten resin is injected in a cylindrical cavity formed between the outer peripheral surface of the core "c1" and the inner peripheral surface of the cylindrical cavity "a1" through the gate "b1", to mold a resin pipe "d2. Then, as shown in FIG. 2-B, the second movable mold "c" is separated from the first movable mold "a", whereby the core "c1" is pulled out of the resin pipe "d", and as shown in FIG. 2-C, the first movable mold "a" is separated from the fixed mold "b", whereby the resin pipe "d" is pulled out of the cavity "a1" of the first movable mold "a" in a state being held by the fixed mold "b", to be thus removed from the mold. Finally, as shown in FIG. 2-D, the resin pipe "d" thus obtained is removed, together with a gate portion "d1", from the fixed mold "b", and is cut from the gate portion "d1". The resin pipe "d" is thus obtained.

In this case, for the base body for a photosensitive drum according to the first invention, at the time of pulling the resin pipe "d" out of the cavity "a1" of the first movable mold "a" shown in FIG. 2-C, stripe-shaped irregularities extending in the axial direction of the resin pipe "d" may be formed on the surface of the resin pipe "d" by scratching the surface of the resin pipe "d" with the inner peripheral surface of the cavity "a1". With this method, by suitably coarsening the inner peripheral surface of the cavity "a1" of the first movable mold "a" so as to form microscopic irregularities thereon, it is possible to easily form microscopic stripe-shaped irregularities extending in the axial direction on the outer peripheral surface of the resin pipe "d".

On the other hand, for the base body for a photosensitive drum according to the second invention, by forming a large number of stripe-shaped irregularities extending in the circumferential direction on the inner peripheral surface of the cavity "a1" of the movable mold "a" and transferring the irregularities on the outer peripheral surface of the resin pipe "d" as a mold product, it is possible to easily form microscopic stripe-shaped irregularities extending in the circumferential direction on the outer peripheral surface of the resin pipe "d". At the time of pulling the resin pipe "d" out of the cavity "a1" of the first movable mold "a", since the irregularities on the outer peripheral surface of the resin pipe do not become undercuts because of contraction of the resin, the resin pipe can be easily pulled out of the cavity "a1" of the first movable mold "a", to be thus removed from the mold.

Like the cylindrical base body 1 shown in FIG. 1, the photosensitive layer 3 is formed on the surface of the base body for a photosensitive drum according to each of the first and second inventions. The base body according to each of the first and second inventions, which is provided with the photosensitive layer 3 as described above, can be suitably used for a photosensitive drum.

The photosensitive layer can be formed on the base body by coating the base body with a known material in accordance with a known process. The layer configuration may be also a known configuration. The thickness of the photosensitive layer is not particularly limited but may be suitably adjusted. In general, the thickness of the photosensitive layer may be in a range of 10 to 50 μm, preferably, 20 to 40 μm. If the thickness of the photosensitive layer is less than 10 μm, the stripe-shaped irregularities on the surface of the base body are transferred to the surface of the photosensitive layer, to impair the surface smoothness of the photosensitive layer, tending to degrade the image quality. On the contrary, if the thickness of the photosensitive layer is more than 50 μm, the function of charging and transferring toner is impaired, tending to degrade the image quality. The other configuration of the photosensitive drum using the body according to each of the first and second inventions may be the same as that of a usual photosensitive drum.

[Third Invention]

A base body for a photosensitive drum according to a third invention will be described below.

A base body for a photosensitive drum according to the third invention is composed of a pipe made from a synthetic resin, wherein a specular gloss at 60° of a surface of the pipe, specified under JIS Z8741, is in a range of 12 to 30.

As a resin material for forming the above pipe, there may be used, while not particularly limited thereto, either of the polyamide resins exemplified in the first and second inventions. In particular, according to the third invention, a mixture of nylon MXD6 and/or nylon 6 and another polyamide resin is preferably used.

As another resin to be mixed with nylon MXD6 and/or nylon 6, there may be used either of the polyamide resins exemplified in the first and second inventions. In particular, according to the third invention, nylon 66, nylon 12, or nylon 46 is preferably used. The content of nylon MXD and/or nylon 6 is not particularly limited; however, it may be in a range of 3 to 30 wt %, preferably, 5 to 15 wt % on the basis of the total amount of nylon MXD6 and/or nylon 6 and another polyamide resin.

In general, to impart conductivity to the resin pipe and adjust the resistance of the resin pipe, a conductive agent is added to the resin for forming the resin pipe. The kind of the conductive agent is not particularly limited in so far as the conductive agent can be uniformly dispersed in the resin. Either of the conductive agents exemplified in the first and second invention can be used. The added amount of the conductive agent may be set, while not particularly limited thereto, in a range of 5 to 30 wt %, preferably, 5 to 20 wt % on the basis of the total amount of the resin composition, so that the surface resistance of the resin pipe be set in a range of $10^6$ Ω/□ (ohm/square) or less, preferably, $10^5$ Ω/□ or less.

Like the first and second inventions, an inorganic filler such as fibers can be added to the resin for forming the resin pipe in order to reinforce or weight the resin. Either of the inorganic fillers exemplified in the first and second inventions can be used.

The added amount of the filler is not particularly limited but is suitably selected depending on the kind of the filler, and lengths and diameters of the fibers. In general, the added amount of the filler may be in a range of about 5 to 40 wt %, preferably, about 10 to 30 wt %, more preferably, about 15 to 20 wt % on the basis of the total amount of the resin composition. Like the first and second inventions, in addition to the above-described conductive agent and filler, a suitable amount of known additives such as polytetrafluoroethylene (PTFE), silicone, molybdenum disulfide ($MoS_2$), various metal soaps can be added to the resin for forming the resin pipe. Further, the conductive agent or filler may be subjected to surface treatment by using a generally used silane coupling agent or titanate coupling agent.

The method of molding the resin pipe is not particularly limited but may be a known method such as an injection molding method or an extrusion molding method. In general, the injection molding method is preferably used. In this case, the molding conditions such as a molding temperature and an injection pressure may be suitably adjusted depending on the kind of the resin material. However, since the temperature condition at the time of molding exerts adverse effect on the specular gloss of the surface of the resin pipe, it must be optimized. This will be described later.

The base body for a photosensitive drum according to the third invention is characterized in that a specular gloss at 60° of the surface of the resin pipe, specified under JIS Z8741, is in a range of 12 to 30, preferably, 15 to 25. In this case, the adjustment of the specular gloss can be made by adjusting the composition of the resin for forming the pipe. Concretely, by adjusting the content of the above-described nylon MDX6 and/or nylon 6 in the above-described range, and injecting the resin composition after adjusting a mold temperature, the above-described specular gloss can be obtained. To be more specific, nylon MDX6 and/or nylon 6 are relatively slow in crystallization rate, and accordingly, these resins can be relatively slowly crystallized by adjusting the mold temperature, whereby a skin layer of these resins can be formed on the surface side of the resin pipe, to achieve the specular gloss of the resin pipe.

The mold temperature is not particularly limited but is suitably adjusted depending on the size of the resin pipe to be molded, the kind of another resin to be mixed with nylon MDX6 and nylon 6, and the like. In general, the mold temperature may be in a range of 95 (injection side) to 130° C. (terminal side), particularly, 100 to 120° C. With this adjustment of the mold temperature, it is possible to form a desirable skin layer from nylon MDX and nylon 6, and hence to adjust the specular gloss of the surface of the resin pipe in the above-described range. With respect to the base body for a photosensitive drum according to the third invention, the method of adjusting the specular gloss is not limited to that described above insofar as the specular gloss of the surface of the resin pipe is adjusted in the above-described range.

Like the cylindrical base body 1 shown in FIG. 1, the photosensitive layer 3 is formed on the surface of the base body for a photosensitive drum according to the third invention. The base body according to the third invention, which is provided with the photosensitive layer 3 as described above, can be suitably used for a photosensitive drum. In this case, the photosensitive layer can be formed on the base body by coating the base body with a known material in accordance with a known process. The layer configuration may be also a known configuration. The other configuration of the photosensitive drum using the base body according to the third invention may be the same as that of a usual photosensitive drum.

[Fourth Invention]

A base body for a photosensitive drum according to the fourth invention will be described below.

The base body for a photosensitive drum according to the fourth invention is composed of a resin pipe molded from a resin composition containing a thermoplastic resin and a conductive agent, wherein the conductive resin pipe has, at an outer peripheral portion in the thickness direction of a peripheral wall, a skin layer having a high resistance, and an amount of the conductive agent present in the skin layer is equal to or less than one-tenth an amount of the conductive agent present in a central portion in the thickness direction of the peripheral wall of the pipe.

As the thermoplastic resin of the resin composition, there can be used any known resin material having been used for a base body for a photosensitive drum insofar as when the resin composition containing the resin material and a conductive agent such as carbon black is molded, a skin layer is formed on a surface portion of the molded product. For example, a polyamide resin such as nylon may be used because it is excellent in chemical resistance and mechanical strength. In particular, a polyamide resin obtained from methaxylylene diamine and adipic acid and/or a polyamide resin obtained from ϵ-caprolactam are preferably used in the fourth invention. The reason for this is as follows: namely, each of these polyamide resins is slower in crystallization rate than another crystallization resin, and accordingly, in the case of molding the resin composition containing the resin and a conductive agent such as carbon black, a skin layer can be relatively easily formed by controlling a cooling rate at the time of molding.

As described in the first and second inventions, a polyamide resin produced by condensation polymerization of methaxylylene diamine and adipic acid is generally called "nylon MXD6", and a polyamide resin produced by ring-opening polymerization of ϵ-caprolactam is generally called "nylon 6".

Even in the fourth invention, a mixture of a plurality of resins may be used as a molding material for the above pipe. For example, a resin mixture obtained by mixing nylon MXD6 and/or nylon 6 with another resin may be used. In this case, another resin is not particularly limited but may be freely selected without departing from the scope of the present invention. Specifically, either of the polyamide resins exemplified in the first and second inventions and a copolymer thereof is preferably used as another resin to be mixed with nylon MXD6 and/or nylon 6. The mixing ratio of these resins is not particularly limited; however, the content of nylon MXD6, nylon 6, or the mixture thereof may be in a range of at least 5 to 70 wt %, preferably, 10 to 50 wt % on the basis of the total amount of nylon MXD6 and/or nylon 6 and another resin.

The kind of the conductive agent added to the above resin composition is not particularly limited insofar as the conductive agent can be uniformly dispersed in the resin. For example, either of the conductive agents exemplified in the first and second inventions can be used. In particular, carbon black is preferably used. The added amount of the conductive agent may be set, while not particularly limited thereto, in a range of 5 to 40 wt %, preferably, 8 to 30 wt % on the basis of the total amount of the resin composition, so that the surface resistance of the resin pipe be set in a range of $10^6$ Ω/□ (ohm/square) or less, preferably, $10^5$ Ω/□ or less.

An inorganic filler such as fibers can be added to the resin for forming the resin pipe in order to reinforce or weight the resin. For example, either of the inorganic fillers exemplified in the first and second inventions can be used.

The added amount of the filler is not particularly limited but is suitably selected depending on the kind of the filler, and lengths and diameters of the fibers. In general, according to the fourth invention, the added amount of the filler may be in a range of about 5 to 40 wt %, preferably, about 10 to 30 wt %, more preferably, about 15 to 20 wt % on the basis of the total amount of the resin composition. Like the first and second inventions, in addition to the above-described conductive agent and filler, a suitable amount of known additives such as polytetrafluoroethylene (PTFE), silicone, molybdenum disulfide ($MoS_2$), various metal soaps can be added to the resin for forming the resin pipe. Further, the conductive agent or filler may be subjected to surface treatment by using a generally used silane coupling agent or titanate coupling agent.

The base body for a photosensitive drum according to the fourth invention is composed of a conductive resin pipe molded from the above resin composition into a cylindrical shape. In this case, the molding method is not particularly limited but may be a known method such as an injection molding method or an extrusion molding method. In general, the injection molding method is preferably used. In this case, the molding conditions such as a molding temperature and an injection pressure may be suitably adjusted depending on the kind of the resin material. However, since the temperature condition at the time of molding exerts adverse effect on the formation of the skin layer as the feature of the fourth invention, it must be adjusted. This will be described later.

The base body for a photosensitive drum according to the fourth invention is characterized in that a skin layer having a high resistance is formed in an outer peripheral portion of a peripheral wall of the conductive resin pipe, wherein an amount of the conductive agent present in the skin layer is equal to or less than 1/10, preferably, 1/50, more preferably, 1/100 an amount of the conductive agent present in a central portion in the thickness direction of the peripheral wall of the conductive resin pipe. If the inorganic filler such as whiskers is added together with the conductive agent, an amount of the inorganic filler present in the skin layer is equal to or less than 1/10, preferably, 1/50, more preferably, 1/100 an amount of the inorganic filler present in a central portion in the thickness direction of the peripheral wall of the conductive resin pipe.

The resistance of the skin layer is not particularly limited but may be set in a range of $10^7$ to $10^{13}$ Ω/□ or less, preferably, $10^7$ to $10^{12}$ Ω/□ or less. By setting the amount of the conductive agent in the skin layer within the above range, such a high resistance of the skin layer can be obtained. If the resistance of the skin layer is more than $10^{13}$ Ω/□, charges are stored in the skin layer and thereby the residual potential become higher, with a result that the sensitivity of the photosensitive body is reduced, tending to cause the image degradation.

The thickness of the skin layer is not particularly limited but may be set in a range of 0.1 to 5 μm, preferably, 0.3 to 2 μm. If the thickness of the skin layer is less than 0.1 μm, the function of cushioning irregularities of the base body and preventing a microscopic abnormality due to impurities or the like may be degraded, and if more than 5 μm, charges are easily stored, tending to cause an increase in the residual potential, reduction in sensitivity of the photosensitive body, and image degradation.

The skin layer of the present invention is a layer continuous to an inner layer (positioned inward from the skin layer) of a peripheral wall of the resin pipe without any interface therebetween, and therefore, it is different from a layer formed by coating the surface of the resin pipe with a resin or stacking a resin sheet thereon. In this case, it is not required that the amount of the conductive agent is clearly changed to one-tenth or less at a position separated from the central portion by a specific thickness. To be more specific, the amount of the conductive agent may be gradually reduced from the central portion to the surface portion, and a portion having a specific thickness, which contains the conductive agent in an amount being one-tenth or less the amount of the conductive agent in the central portion, be present in the surface portion.

The method of forming the skin layer is not particularly limited insofar as the above-described skin layer is formed. For example, in the case of producing the resin pipe by injection-molding a conductive resin composition containing nylon MXD6 and/or nylon 6 as the thermoplastic resin, the skin layer can be easily formed by slowly cooling and solidifying the molded produced by retarding the cooling rate after injection molding. To be more specific, according to a general process of molding nylon MXD6 and/or nylon 6, a molten resin at a resin temperature of about 280° C. is injected in a mold kept at about 80° C., and is cooled at a cooling rate of about 200° C./min; however, according to the present invention, to form the above skin layer, the molded resin is relatively slowly cooled and solidified by setting the mold temperature in a range of 100 to 150° C., preferably, 120 to 140° C., and setting the cooling rate in a range of 150° C./min or less, preferably, 80 to 130° C./min.

Like the first, second and third inventions, that is, like the cylindrical base body 1 shown in FIG. 1, the photosensitive layer 3 is formed on the surface of the base body for a photosensitive drum according to the fourth invention, to obtain a photosensitive drum. In this case, according to the base body for a photosensitive drum of the fourth invention, it is not required to form an under coat layer between the base body 1 and the photosensitive layer 3, that is, the photosensitive layer can be directly formed on the outer peripheral surface of the base body of the present invention. In addition, the photosensitive layer can be formed by coating the base body with a known material in accordance with a known method. The layer configuration of the photosensitive layer may be the same as a known layer configuration. The other configurations of the photosensitive drum thus obtained according to the fourth invention may be the same as those of a general photosensitive drum.

In addition, each of the base bodies for photosensitive drums according to the first to fourth inventions and the structure of the photosensitive drum using the base body are not limited to those shown in FIG. 1 but may be variously changed without departing from the scope of each of the first to fourth inventions. For example, in the photosensitive drum shown in FIG. 1, the flanges 2*a* and 2*b* separately formed are fixedly fitted to both end surfaces of the cylindrical base body 1; however, at least one of the flanges 2*a* and 2*b* may be formed integrally with the base body of the present invention, which is composed of the above-described resin pipe, and the starting gear 6 may be formed, together with the flange, integrally with the base body.

EXAMPLES

Hereinafter, each of the first to fourth inventions will be more clearly described by using the following examples.

[First Invention and Second Invention]

Example 1

A resin composition described below was prepared and was molded into a resin pipe in accordance with the above-described process shown in FIGS. 2-A to 2-D. At the time of pulling a resin pipe "d" from a cavity "a1" of a first movable mold "a" shown in FIG. 2-C, stripe-shaped irregularities composed of microscopic projections and depressions were formed on the surface of the resin pipe "d". The surface roughness of the resin pipe "d" was measured. As a result, it was found that a center line average height Ra was 0.04 μm and a maximum height Rmax was 0.5 μm.

| Resin Composition | |
|---|---|
| nylon 66 (UBE Nylon/Ube Industries, Ltd.) | 60 wt % |
| nylon 6 (UBE Nylon/Ube Industries, Ltd.) | 10 wt % |
| carbon black (Ketchen Black/Lion Corporation) | 10 wt % |
| whiskers of potassium titanate (Whistatt/Otsuka Chemical Co., Ltd.) | 20 wt % |

The outer peripheral surface of a base body composed of the resin pipe thus obtained was coated with a paint prepared by dissolving a polyester resin containing a phthalocyanine based pigment in chloroform, to form a charge generating layer, and then coated with a paint prepared by dissolving a polycarbonate resin containing a hydrazone based compound in chloroform, to form a charge transfer layer, whereby a photosensitive layer having a thickness of 30 μm was formed on the outer peripheral surface of the base body. A photosensitive drum according to the first invention was thus obtained. The photosensitive drum was mounted to a laser printer and subjected to an imaging test. As a result, a very clear and high quality image was obtained.

Example 2

The same resin composition as that used in Example 1 was molded into a resin pipe in accordance with the above-described process shown in FIGS. 2-A to 2-D. In this case, a large number of stripe-shaped irregularities extending in the circumferential direction were formed on the inner peripheral surface of the cavity "a1" of the first movable mold "a" shown in FIG. 2-C, and stripe-shaped irregularities composed of microscopic projections and depressions extending in the circumferential direction were formed on the surface of the resin pipe "d". The surface roughness of the resin pipe was then measured. As a result, it was found that a center line average height Ra was 0.04 μm and a maximum height Rmax was 0.4 μm.

Like Example 1, a charge generating layer and a charge transfer layer were formed on the surface of a base body composed of the above resin pipe, to form a photosensitive layer having a thickness of 30 μm. A photosensitive drum according to the second invention was thus obtained. The photosensitive drum was mounted to a laser printer and subjected to an imaging test. As a result, a very clear and high quality image was obtained.

As is apparent from Examples 1 and 2, according to the base body for a photosensitive drum of each of the first and second inventions, since microscopic irregularities composed of stripe-shaped projections and depressions extending in the axial direction (first invention) or the circumferential direction (second invention) are formed on the surface of the base body, it is possible to scatter light rays having reached the surface of the base body, and hence to suppress the degradation of an image quality due to interference between light rays and thereby improve the image quality.

[Third Invention]

Examples 3 to 6 and Comparative Examples 1 to 5

Each resin composition shown in Table 1 was injection-molded under a condition shown in Table 1, to obtain a resin pipe. With respect to the resin pipe thus obtained, a specular gloss at 60° specified under JIS Z8741 was measured. The result is shown in Table 1. In addition, the specular gloss was measured by using a glossmeter (trade name "Gloss Meter VG2000", sold by Nippon Denshoku Industries Co., Ltd).

The outer peripheral surface of a base body composed of each resin pipe thus obtained was coated with a paint prepared by dissolving a polyester resin containing a phthalocyanine based pigment in chloroform, to form a charge generating layer, and then coated with a paint prepared by dissolving a polycarbonate resin containing a hydrazone based compound in chloroform, to form a charge transfer layer, whereby a photosensitive layer having a thickness of 30 μm was formed on the outer peripheral surface of the base body. A photosensitive drum was thus obtained. The photosensitive drum was mounted to a laser beam printer and subjected to an imaging test. The result of evaluating an image quality for each photosensitive drum is shown in Table 1.

TABLE 1

| | Composition (mass %) | | | | | Mold temperature (° C.) | | | |
|---|---|---|---|---|---|---|---|---|---|
| | PA66 | MDX6 | PA6 | C/B | Whisker | Terminal side | Injection side | Specular gloss | Printing characteristic |
| Inventive Examples | | | | | | | | | |
| 3 | 65 | 5 | 0 | 12 | 18 | 120 | 110 | 18 | Good |
| 4 | 65 | 0 | 5 | 12 | 18 | 120 | 110 | 16 | Good |
| 5 | 60 | 10 | 0 | 12 | 18 | 120 | 110 | 22 | Good |
| 6 | 50 | 0 | 20 | 12 | 18 | 120 | 110 | 20 | Good |
| Comparative Examples | | | | | | | | | |
| 1 | 65 | 5 | 0 | 12 | 18 | 80 | 70 | 11 | Occurrence of black points |
| 2 | 65 | 0 | 5 | 12 | 18 | 80 | 70 | 10 | Occurrence of black points |
| 3 | 30 | 40 | 0 | 12 | 18 | 120 | 110 | 38 | Occurence of black points |
| 4 | 30 | 40 | 0 | 12 | 18 | 80 | 70 | 31 | Occurrence of black points |
| 5 | 70 | 0 | 0 | 12 | 18 | 80 | 70 | 9 | Occurrence of black points |

PA66: nylon 66 (trade name: "Novamid", sold by Mitsubishi Engineering Plastic Corp.)
MDX6: nylon MDX6 (trade name: "Renny", sold by Mitsubishi Engineering Plastic Corp.)
PA6: nylon 6 (trade name: "UBE Nylon", sold by Ube Industries, Ltd.)
C/B: carbon black (trade name: "Ketchen Black", sold by Lion Corportation
Whisker: whisker fibers of potassium titanate (trade name: "DENTALL", sold by Otsuka Chemical Co., Ltd.)

As is apparent from Table 1, it is revealed that the photosensitive drum including the base body composed of the resin pipe with its surface gloss optimized, prepared in each of Examples 3 to 6 according to the third invention can certainly exhibits a good image quality.

In this way, according to the base body for a photosensitive drum of the third invention, since the surface gloss thereof is optimized, it is possible to improve the image quality obtained by using the photosensitive drum including the base body.

[Fourth Invention]

Example 7

A resin composition described below was prepared and was injection-molded under a molding condition described below, to obtain a conductive resin pipe having a diameter (outer diameter) of 30 mm, a length of 260 mm, and a peripheral wall thickness of 1.5 mm.

| Resin Composition | |
|---|---|
| nylon 66 (UBE Nylon/Ube industries, Ltd.) | 50 wt % |
| nylon MXD6 (Renny/Mitsubishi Engineering Plastic Corp.) | 20 wt % |
| whickers of potassium titanate (Tismo/Otsuka Chemical Co., Ltd.) | 20 wt % |
| carbon black (Ketchen Black/Lion Corporation) | 10 wt % |
| **Molding Condition** | |
| Resin temperature: 260 to 280° C. | |
| Mold temperature: 130° C. | |
| Cooling rate: 120° C./mm | |
| Injection pressure: 800 kgf/cm$^2$ | |

Part of the resin pipe was cut, and the cross section of the peripheral wall of the resin cut was observed by an electron microscope. As a result, it was found that a surface portion of the peripheral wall having a depth of 10 μm was a skin layer containing the filler (ketchen black and whiskers of potassium titanate) in an amount being 1/50 or less the amount of the filler in the central portion, and that the filler was little present in a range of 2 μm from the surface. Further, the surface resistance of the resin pipe was measured. As a result, it was found that the surface resistance was $10^{13}$ $\Omega/\square$ or less, and thereby the surface of the resin pipe was nearly insulating.

The outer peripheral surface of the resin pipe thus obtained was coated with a paint prepared by dissolving a polyester resin containing a phthalocyanine based pigment in chloroform, to form a charge generating layer, and then coated with a paint prepared by dissolving a polycarbonate resin containing a hydrazone based compound in chloroform, to form a charge transfer layer, whereby a photosensitive layer having a thickness of 30 μm was formed. A photosensitive drum according to the fourth invention was thus obtained. The photosensitive drum was mounted to a laser printer and subjected to an imaging test. As a result, it was found that good images were stably obtained.

In this way, according to the base body for a photosensitive drum of the fourth invention, it is possible to realize a photosensitive drum capable of certainly obtaining good images even if an under coat layer having been conventionally provided between the base body and a photosensitive layer is omitted.

What is claimed is:

1. A base body for a photosensitive drum, comprising:

a conductive resin pipe molded from a resin composition containing thermoplastic resin and a conductive agent;

wherein said conductive resin pipe has, at an outer peripheral portion in the thickness direction of a peripheral wall of said conductive resin pipe, a skin layer having a surface resistance of $10^7$ to $10^{13}$ $\Omega/\square$; and an amount of said conductive agent present in said skin layer is equal to, or less than, one-tenth an amount of said conductive agent present in a central portion in the thickness direction of the peripheral wall of said conductive resin pipe.

2. A base body for a photosensitive drum according to claim 1, wherein the thickness of said skin layer is in a range of 0.1 to 5.0 $\mu$m.

3. A base body for a photosensitive drum according to claim 1, wherein said thermoplastic resin contains a polyamide resin obtained from methaxylylene diamine and adipic acid and/or a polyamide resin obtained from $\epsilon$-caprolactam.

4. A base body for a photosensitive drum according to claim 2, wherein said thermoplastic resin contains a polyamide resin obtained from methaxylylene diamine and adipic acid and/or a polyamide resin obtained from $\epsilon$-caprolactam.

5. A photosensitive drum comprising:

a cylindrical base body; and a photosensitive layer formed on an outer peripheral surface of said cylindrical base body;

wherein said cylindrical base body is formed of a conductive resin pipe molded from a resin composition containing a thermoplastic resin and a conductive agent; and said conductive resin pipe has, at an outer peripheral portion in the thickness direction of a peripheral wall of said conductive resin pipe, a skin layer having a surface resistance of $10^7$ to $10^{13}$ 106 /□, and an amount of said conductive agent present in said skin layer is equal to, or less than, one-tenth an amount of said conductive agent present in a central portion in the thickness direction of the peripheral wall of said conductive resin pipe.

6. A photosensitive drum according to claim 5, wherein the thickness of said skin layer is in a range of 0.1 to 5.0 $\mu$m.

7. A photosensitive drum according to claim 5, wherein said thermoplastic resin contains a polyamide resin obtained from methaxylylene diamine and adipic acid and/or a polyamide resin obtained from $\epsilon$-caprolactam.

8. A photosensitive drum according to claim 6, wherein said thermoplastic resin contains a polyamide resin obtained from methaxylylene diamine and adipic acid and/or a polyamide resin obtained from $\epsilon$-caprolactam.

* * * * *